Feb. 19, 1929.
W. C. PRICHARD
1,702,746
AUTOMOBILE HEADLIGHT
Filed May 26, 1926    3 Sheets-Sheet 2
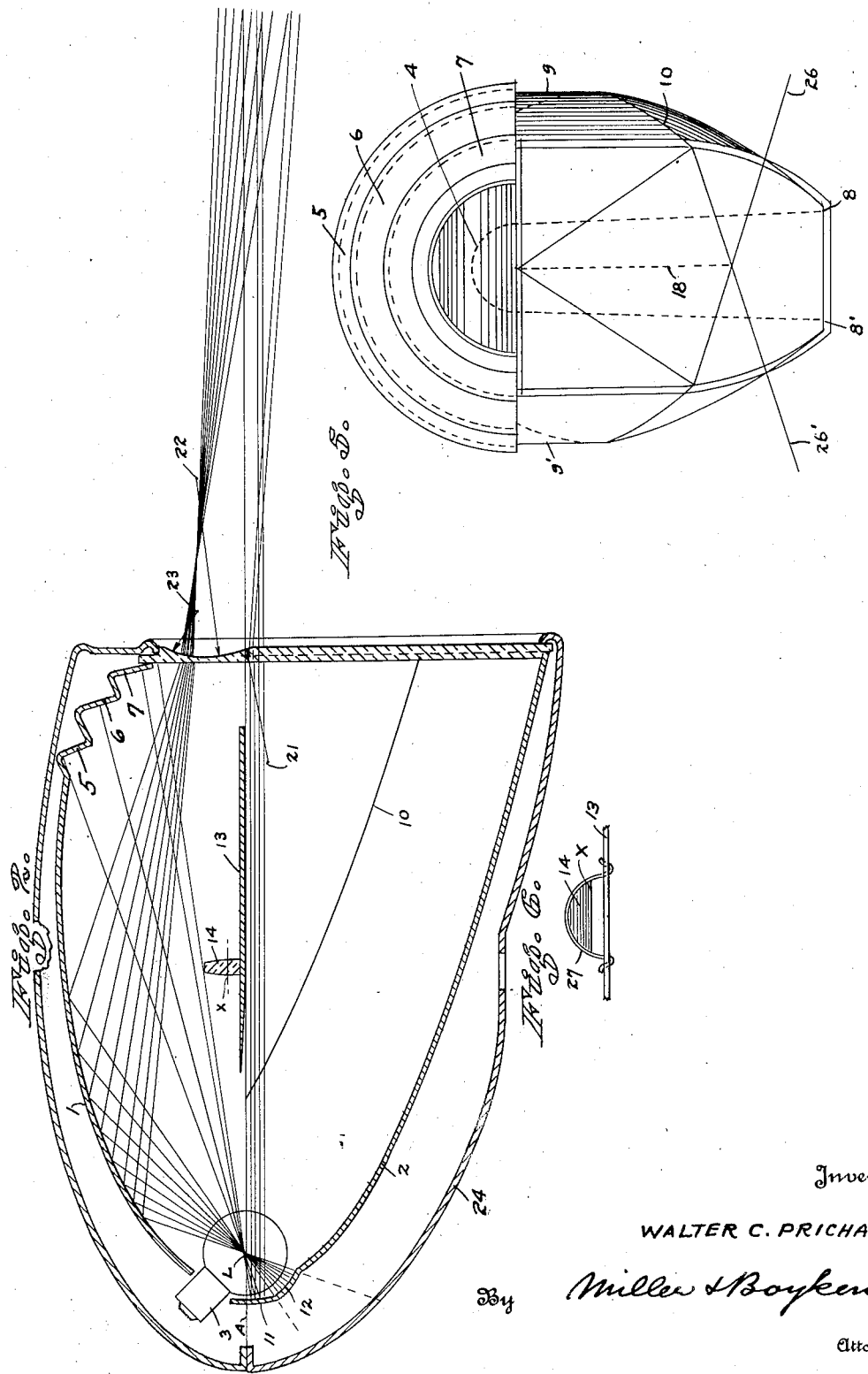
Inventor
WALTER C. PRICHARD
By Miller & Boyken
Attorney

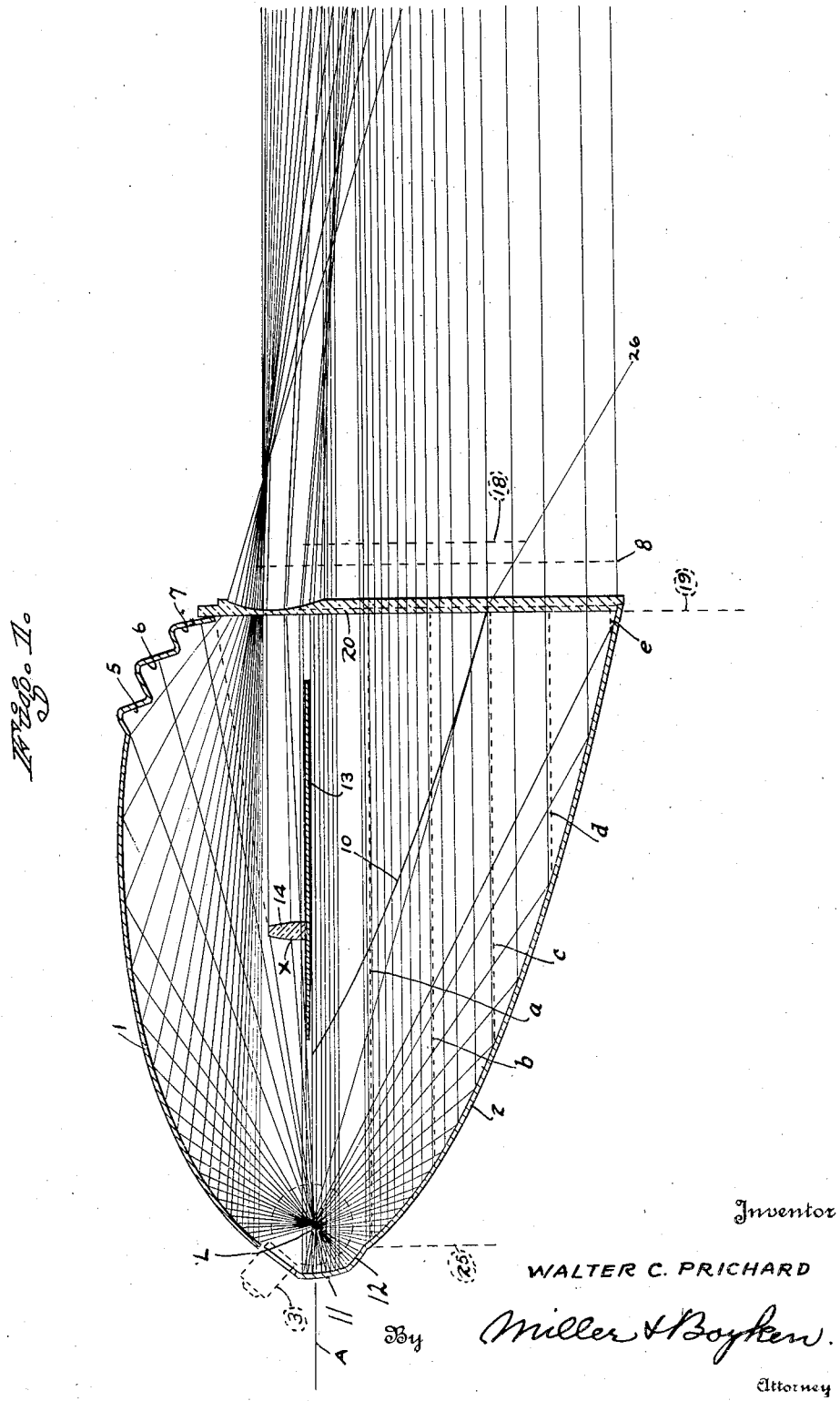

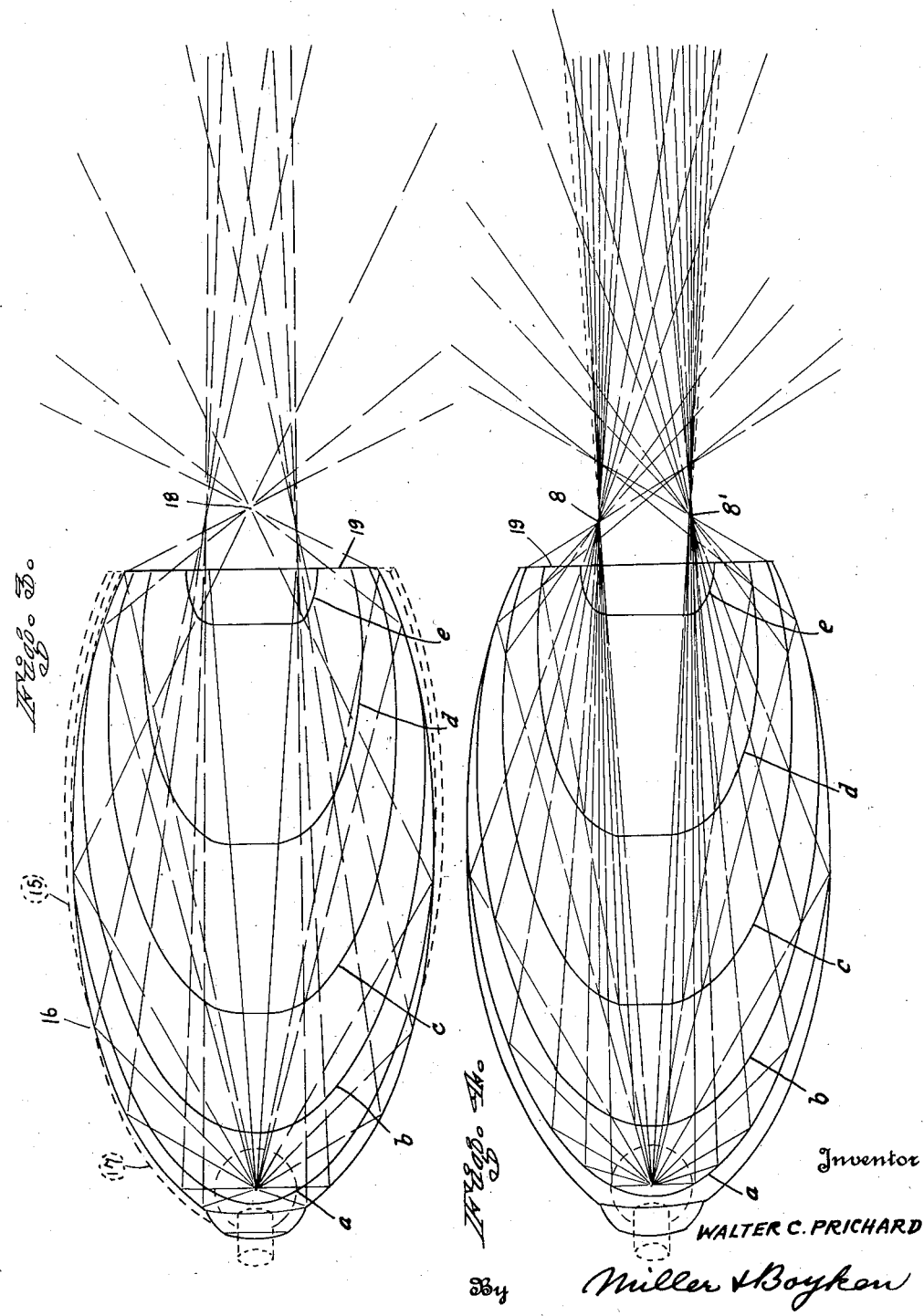

Patented Feb. 19, 1929.

1,702,746

UNITED STATES PATENT OFFICE.

WALTER C. PRICHARD, OF BERKELEY, CALIFORNIA.

AUTOMOBILE HEADLIGHT.

Application filed May 26, 1926. Serial No. 111,696.

This invention relates to headlights for use on automobiles, and has to do with a special arrangement of reflecting surfaces and refracting means for determining the shape and dispersion of the projected rays of light.

The objects of the invention are to provide improvements in such combinations whereby a more desirable beam is projected and also which will utilize to great advantage more of the emitted rays from the light source located within the headlight.

As the invention relates specifically to the light controlling surfaces no detail of the headlight body construction is attempted in the drawings hereto illustrating the invention.

In the drawings which are half size reprepresentation of a full size device, Figure 1 is a longitudinal central sectional elevation of a headlight embodying the combination of reflecting and refracting means in accordance with my invention and indicating the projection of equally spaced radial rays emanating from its light source.

Figure 2 is a similar view showing how some of the rays of the lamp are re-reflected so as to make them useful in the projected beam.

Figure 3 is a horizontal cross section of the headlight along the main horizontal axis showing the reflection and projection of light rays therealong and indicating several spaced horizontal planes of the reflectors below said axis.

Figure 4 is a view similar to that of Figure 3 but shows the reflection of rays at the spaced planes above mentioned.

Figure 5 is a front view of the complete combination.

Figure 6 is a front view of the special lens, which is supported within the reflector system on a horizontal diaphragm indicated in the elevations.

Before going into detail of the invention it is desired to say that applicant's invention lies in the specific modification of certain main reflector forms enclosing the light source, together with the combination therewith of other light modifying means, and not broadly in the general form of the enclosing reflectors from which the modifications were evolved, as the reason for modification was to produce a more nearly ideal projected beam than possible with the unmodified general form, and which being the case a description of the reflector forms as modified will be entered into, to be followed by the action of these forms on the light rays.

Referring to Figure 1 a source of light is indicated at L and the reflector system comprises principally an ovoid upper shell 1 extending downward to the horizontal axis A, and a lower ovoid shell 2 enclosing the lower half of the figure except for an opening at the forward end of the combination for the emission of the light rays, and a small hole at the rear end for the shank 3 of the electric globe used as the light source.

This upper shell 1 is an ellipse of revolution revolved about one focus coincident with the light source and a semi-circle at the forward end indicated by the dotted curve 4 in Figure 5, or in other words, revolved about a narrow half cone whose apex lies at the light source positioned at the rear focus of the ellipse.

At the forward end the upper shell is formed with several steps 5, 6, 7, which are portions of spheres traced from the light source or what may be termed the principal focus of the headlight.

The lower shell 2 is a compound ovoid which before modification was in plan an infinite series of superimposed ellipses decreasing in size downwardly, with their forward foci on a common vertical locus and with their rear foci and apices forming parabolas when viewed in elevation, the rear apices forming the rear wall of the lower reflector. This figure was then bisected vertically and opened up at it forward end angularly from the principal focal point L so as to diverge about 8° after which the halves were tipped outwardly about 2° at the bottom only while fulcrumed on the main focal point L with a result that the original locus for the forward foci is changed into two loci vertical when viewed in side elevation as denoted by the dotted line 8 in Figure 1 and diverging slightly downward as indicated by the dotted lines 8 and 8' in Figure 5 while at the upper end they join the dotted arc 4 or semi-circle locus of the ovoid upper shell.

After forming the lower shell as described the wedge-shaped slot at the bottom is closed by a section forming a parabola when viewed in side elevation, and the side walls are modified by cleaving them with an elliptical tube lowered vertically to cut off portions of the side walls and take the place of the portions cut off so as to form vertical wedge shaped walls to a portion of the reflector at opposite sides thereof as indicated at 9 and 9' in Figure 5 merging with the lower reflector along the line 10. The ellipse to which this tube is formed is of a size to intersect the original ellipse (dotted at 15 in Figure 3) at 16 extending to the forward end of the headlight as per solid outer line while to the rear of point 16 it would pass outside of the reflector along the dotted path 17. The rear focus of the elliptical tube is located at L and the forward locus at 18 beyond the loci 8 and 8', the compound reflector being cut off along the line 19 spaced back of these points.

The upper and lower shells are suitably held together along a horizontal plane through the principal focal point and at the rear end the shank of the lamp extends at an upward angle through the reflector while the reflector figure is further modified to form a paraboloid 11 directly in back of the globe joined to the main reflector walls by an annular spherical portion 12.

Within the reflecting surfaces is mounted a flat reflector diaphragm 13 with upper surface horizontal and extending across to opposite side walls, while upon the diaphragm is mounted a special semi-circular lens or prismatic glass 14 having straight lower walls to the point X and upwardly converging walls above this point.

At the forward end of the reflector system and closing the opening at the line 19 is a glass plate 20 formed with substantially parallel sides at its lower portion and of varying curved thickness extending straight across the width of the glass at its upper portion on curves struck from centers 21, 22, 23 as indicated in Figure 2.

This glass is held in position by a suitably formed outer shell or lamp housing 24 as indicated on Figure 2 which may also be divided along horizontal or vertical axis for assembly, or the lens glass may be supported in any other way desired.

Having thus described the shape and relation of all the reflecting and refracting elements it will suffice to show the effect of the combination on light emitted from L.

In Figure 1, a series of equally spaced radial lines from L denoting rays (with the exception of the two striking the last forward upper and lower edges of the reflector and which are not equally spaced with the others) show that all rays in the lower shell 2 forward of a vertical line 25 back of the light source are projected horizontally, those striking the spherical surface 12 are projected back through the light source to the upper reflector 1, and those striking backward to the parabolic surface 11 are projected directly forward, any upward direction of these rays due to non-theoretical position of light filament or other direct rays from the lamp being intercepted by the diaphragm 13, while those immediately above the diaphragm in the central area pass through the lens 14 and are bent to parallelism as indicated, while the rays striking the upper reflector are all projected downwardly towards its anterior foci located on the circular locus. However, the lens curves of the glass 20 are so formed as to bend the downwardly reflected rays to a lesser descending angle as they emerge from the glass and to act more upon the higher rays of greater angular descent than upon the lower rays of smaller angular descent and thereby lifting a lot of otherwise wasted light to help equalize the central portion of the beam, all as clearly indicated in the figure by a simple inspection of the rays.

Figure 2 omits many of the rays so as to more clearly show the action of the spherical surfaces 5, 6, and 7 in projecting rays, otherwise lost, back through the source of light for effective reflection from the parabolic surface 11 and from the spherical surface 12 similarly to the upper reflector.

Figures 3 and 4 show the effect of wedging open the lower reflector to form the two loci 8 and 8' at its forward end to lessen the angular side spread of the rays and form a central substantially 8 degree angular central beam of almost evenly distributed rays (and practically doubling the candle power within the angle.)

In Figure 3 the reflection of the rays along the main horizontal axis is indicated, and in Figure 4 the ovaloid lines within the reflector indicate equally spaced horizontal planes $a$, $b$, $c$, $d$, and $e$ below the main axis, while the rays are supposed to be vertical planes of light so as to show their reflection from points of impingement at these horizontal planes.

All rays below the main horizontal axis striking the vertical walls 9 and 9' are reflected downwardly as well as forwardly, thus causing the rearmost projected rays 26 and 26' to strike the ground about 4½ feet in front of the car and about the same distance outside of the opposite wheel.

The angular tipping of the sides to diverge the loci 8 and 8' downwardly results in tipping the otherwise horizontal transverse planes of forwardly projected horizontal rays two degrees downward toward the sides of the road so that the upper surface of the projected beam from the headlight presents a slight gable roof formation, thus keeping the surface of the beam within a general horizontal plane where it meets an oncoming motorist even tho the vehicle carrying my headlight is to one side of the arch of the road.

The small semi-circular lens 14 is best secured to the diaphragm by cementing or with a very thin metal strap 37 as indicated in Figure 6 and the function of this lens is to intercept the direct rays from the light source which would otherwise leave the headlight at an upward angle, and bend them downward into the main beam at and below the horizontal, so as to avoid any such upwardly slanting rays causing a glare to an approaching motorist.

The compound curvature of the upper portion of the forward glass 20 is such as to intercept the sharply descending rays from the upper front portion of the upper reflector which ordinarily would strike the ground too near the car, and bend them for projection further along the road for strengthening the light field in the middle distance while at the same time it bends downward the near horizontal rays from the forward portion of the sides of the upper reflector so as to better illuminate the sides of the road.

The peculiar formation of the upper reflector through revolving an ellipse around a hemi-cone as described results in its projecting a more even and concentrated beam of light than produced by a hemi-ellipsoid, giving a similar effect as the spreading of the forward locus of the parent lower reflector from the center to the loci 8 and 8', in fact forming a curved locus for the upper reflector joining said loci.

If it were possible to obtain a point light source at the focal point of a hemi-ellipsoid reflector without any supporting member to intercept any of the rays, the beam or light field projected would be a half-cone which would produce a semi-circle light field on a screen a short distance in front of the reflector, the light being most intense at the center and tapering off toward the outside. With the best present available light source, the incandescent electric light, inserted thru the apex of the ellipsoid the portion of the reflector which should project the rays to the center of the field would be missing and certain rays from the portion of the reflector behind the lamp being refracted and reflected by the glass of the lamp cause a dark spot or shadow in the center of the field where the light should be brightest.

The above reflector not only does away with this dark spot but actually overlaps the rays from the two sides forming a spot of high intensity at the center where it is needed the most.

The vertical walls 9 and 9' through their effect in reflecting the rays downwardly and through the locus 18 are particularly effective in lighting the side of the road and the ditch.

I claim:

1. In a headlight of the character described, an ovoidal reflector the portion above the main horizontal axis of which takes the form of a hemi-ellipse of revolution revolved around the curved wall of a hemi-cone whose apex lies at the light source and one of the foci of the ellipse; and the portion below said horizontal axis takes a form derived from a body elliptical in horizontal cross sections and parabolic on vertical sections, said body being split vertically on its center line and angularly spread at its forward end while fulcrumed at the light source.

2. In a headlight of the character described, an ovoidal reflector the portion above the main horizontal axis of which takes the form of a hemi-ellipse of revolution revolved around the curved wall of a hemi-cone whose apex lies at the light source and one of the foci of the ellipse; and the portion below said horizontal axis takes a form derived from a body elliptical in horizontal cross sections and parabolic on vertical sections, said body being split vertically on its center line and angularly spread at its forward end while fulcrumed at the light source, and the side walls being substantially vertical through a wedge shaped area flaring forwardly.

3. In a vehicle headlight of the character described, a reflector taking the form substantially as specified in claim 2 and cut off vertically at its forward end within its outer focus, a light source at the other focus, a glass plate closing the cut off end of the figure provided with substantially parallel walls at its lower major portion and with ray modifying curvatures at its upper portion only adapted to bend upwardly some of the upper rays above the main horizontal axis of the headlight only.

4. In a vehicle headlight of the character described, a reflector taking the form substantially as specified in claim 2 and cut off vertically at its forward end within its outer focus, a light source at the other focus, a glass plate closing the cut off end of the figure provided with substantially parallel walls at its lower major portion and with ray modifying curvatures at its upper portion above the main horizontal axis of the headlight only formed and adapted to bend the uppermost rays from the headlight upwardly with decreasing effect on the next lower rays and to bend the rays immediately above the main horizontal axis of the reflector downwardly.

5. In a vehicle headlight of the character described, a reflector taking the form substantially of an ovoidal body horizontally arranged and vertically truncated at its forward end within its outer focus, a light positioned at its inner main focus, and the sides of said ovoid below its main horizontal axis only including forwardly flaring segments of substantially vertical walls following in plan the outline of an ellipse whose inner focus is substantially coincident with said light and its outer focus beyond the outer focus of the ovoidal body.

WALTER C. PRICHARD.